United States Patent [19]

Ehlig

[11] 4,120,939
[45] Oct. 17, 1978

[54] HYDROGEN FLUORIDE PROCESS

[75] Inventor: William Hollis Ehlig, Baytown, Tex.

[73] Assignee: E. I. Du Pont de Nemours and Company, Wilmington, Del.

[21] Appl. No.: 800,869

[22] Filed: May 26, 1977

[51] Int. Cl.$^2$ .............................................. C01B 7/22
[52] U.S. Cl. .................................. 423/483; 423/485; 423/555
[58] Field of Search ................ 423/483, 485, 555, 551

[56] References Cited

U.S. PATENT DOCUMENTS

| 3,102,787 | 9/1963 | McMillan et al. | 423/485 |
| 3,278,265 | 10/1966 | Quarles | 423/485 |
| 3,282,644 | 11/1966 | Quarles | 423/485 |
| 3,469,939 | 9/1969 | Aiso et al. | 423/555 X |

Primary Examiner—Brian Hearn

[57] ABSTRACT

Anhydrous hydrogen fluoride is manufactured by dropping small particles of a metal fluoride, e.g., calcium fluoride, through a reaction zone countercurrent to a gas stream containing sulfur trioxide, sulfuric acid and water vapor.

4 Claims, 1 Drawing Figure

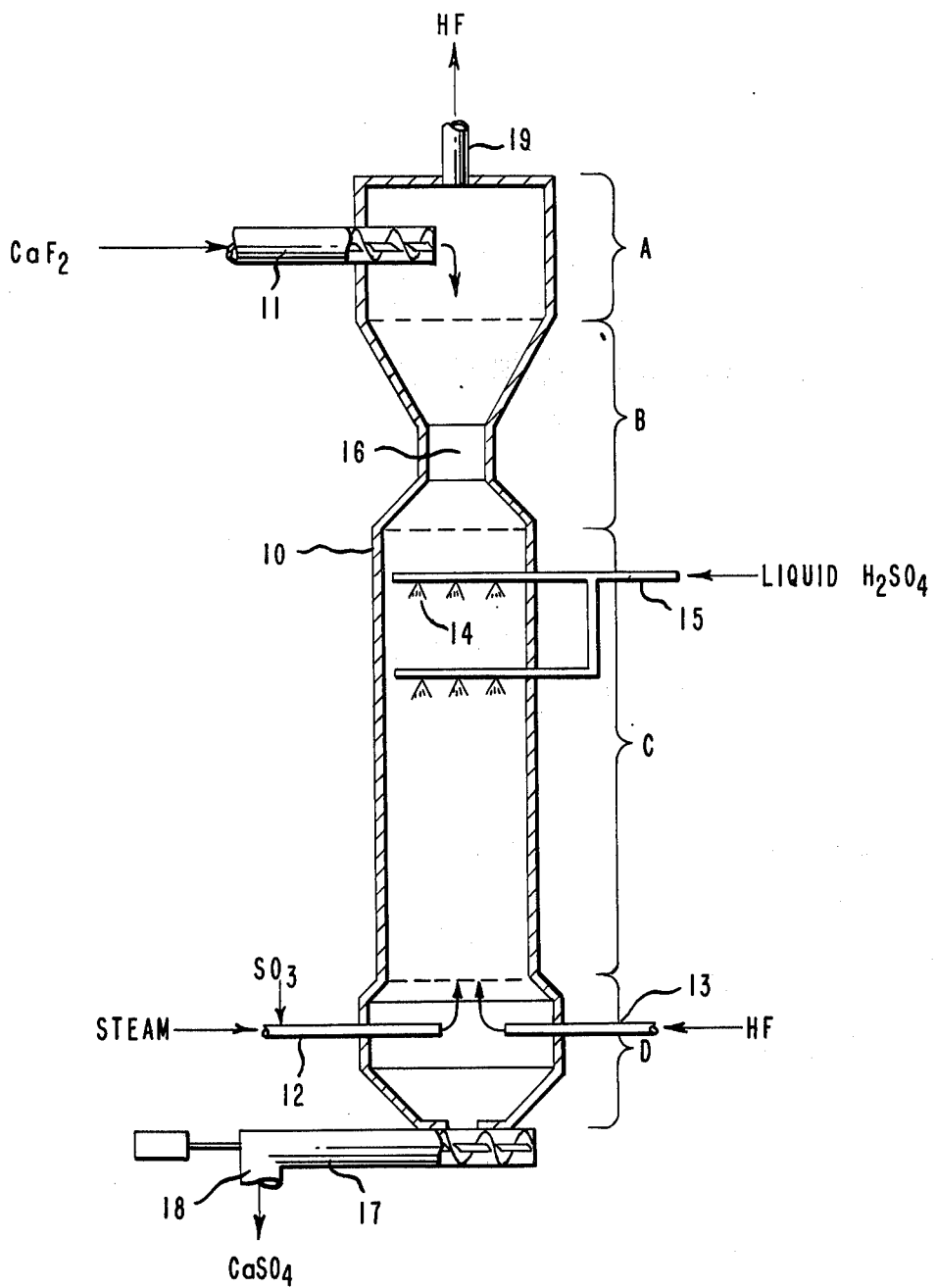

HYDROGEN FLUORIDE PROCESS

BACKGROUND OF THE INVENTION

Most commercial processes for manufacturing anhydrous hydrogen fluoride (hereafter HF) involves the reaction of sulfuric acid on a metal fluoride, e.g., calcium fluoride or fluorspar. This reaction takes place in a rotary kiln, see for example U.S. Pat. No. 3,102,787. However, processes have been taught for this reaction involving a fluidized bed of particulate calcium fluoride, see U.S. Pat. Nos. 3,207,579 and 3,278,265, or by spraying preheated sulfuric acid on preheated particulate fluorspar, i.e., U.S. Pat. No. 3,469,939.

The reaction rate between calcium fluoride and sulfuric acid is fairly rapid; however, the processes in use to date have not been able to take advantage of this fact. Thus the art is still looking for methods for conducting this reaction which will reduce reactor hold-up time and can be conducted in simple equipment, thus requiring less investment and maintenance.

SUMMARY OF THE INVENTION

The above advantages can be obtained by conducting the reaction in a free-fall, stationary reactor. Particles of metal fluoride, e.g., calcium fluoride, having a particle size between 1 and 300 microns, preferably 100 to 200 microns are introduced into the top of the reactor. The particles drop through the reactor countercurrent to a gas stream containing sulfur trioxide, sulfuric acid and water vapors. The gas stream is maintained at or near its dew point in the reaction zone of the reactor. The rate the particles of metal fluoride fall through the reactor is controlled such that the particles, coated with a liquid phase of condensed sulfuric acid, are maintained in the free-fall state for a period of time sufficient to complete the reaction to metal sulfate, e.g., calcium sulfate. The sulfuric acid reacts with the metal fluoride to produce gaseous hydrogen fluoride which is recovered overhead and metal sulfate which is removed from the bottom of the reactor.

The rate the particles of metal fluoride fall through the reactor can be controlled by appropriate adjustment of various process parameters, such as the size of the particles, the length of the reactor, constrictions in the reactor, and the rate of gas flow. What is desired is that while the particles are in the reaction zone of the reactor a liquid phase of condensed sulfuric acid is maintained on their surfaces so that the desired reaction can take place. This usually requires that the particles remain in the reaction zone for 5 to 30 seconds.

The process of the invention has the advantage in that it utilizes the rapid reaction between the metal fluoride and the sulfuric acid in a reactor of simple design. The reactor is easy to operate and maintain, and it is easily sealed to prevent the release of toxic gases to the atmosphere. The process can produce a high yield based on raw materials and also a crude hydrogen fluoride gas which is essentially free of noncondensible contaminants. A further advantage is that the production rate of the process can be reduced, e.g., by a factor of 10, without the need of significant equipment modifications.

DESCRIPTION OF THE DRAWING

The FIGURE is a schematic illustration of an embodiment of the process of the invention.

DESCRIPTION OF THE INVENTION

The present process applies to the preparation of hydrogen fluoride from any alkali metal or alkaline earth metal fluoride. Because of its low cost, the mineral fluorspar, which is essentially calcium fluoride, is preferred and the following description will be directed to that preferred embodiment.

The fluorspar used in the process normally has a particle size between 1 and 300 microns, preferably between 100 and 200 microns; this fluorspar is usually called "Acid Grade Fluorspar." If fluorspar of finer particle size is available, it can be used; however, it will need to be pelleted prior to introduction into the reaction zone or it will need to be agglomerated in the top of the reactor, i.e., Zone A. This can be accomplished by maintaining the particles in the top portion of the reactor for a sufficient period of time to enable sulfuric acid to condense on their surfaces. This in turn causes the particles to become sticky and to agglomerate. The larger size of the agglomerates then allows them to pass countercurrent to the gas stream and into the remainder of the reaction zone.

The invention will now be illustrated with respect to the FIGURE which illustrates one of the embodiments of the invention.

A vertical, stationary reactor 10 can be considered as divided into four zones, although there are no physical dividers between the zones. Through feed pipe 11, a feed of fluorspar of the desired particle size is fed into Zone A at the top of the reactor. As the particles are introduced into the reactor, they can be evenly distributed across the cross-section of the reactor by suitable means (not illustrated) such as a spinning disc or a cone deflector.

In the bottom of the reactor, i.e., Zone D, steam and gaseous sulfur trioxide are introduced into the reactor through pipe 12. Optionally, HF or another gas inert to the reaction such as air is also introduced in Zone D through pipe 13. The steam and gaseous sulfur trioxide partially react to form sulfuric acid vapor and heat. The product of this reaction is a superheated gas stream containing the vapors of sulfuric acid, sulfur trioxide, water and optionally the inert gas. As this gas stream enters Zone D, it has a temperature above its dew point, i.e., above 330° C. at atmospheric pressure. In Zone D this gas stream contacts the falling solid particles which have liquid sulfuric acid on their surfaces. The liquid acid is evaporated, thus cooling the gas stream and associating more of the sulfur trioxide and steam. This continues until the gas stream is at its dew point. This gas stream rises through the reactor from Zone D to Zone A countercurrent to the path of the falling solid particles of fluorspar and calcium sulfate.

The major portion of the vertical reactor is the reaction zone, i.e., Zone C. Into this zone can be fed liquid sulfuric acid through multiple spray addition nozzles 14 in pipe 15. This liquid acid is vaporized by and enters the rising gas stream. Sufficient additional liquid sulfuric acid is added in this manner to satisfy the process mass and energy balances as will be subsequently explained.

In the embodiment of the invention illustrated the reactor has a constriction 16 in Zone B. This constriction is such that fine particles of fluorspar can remain suspended in Zone A until they agglomerate and become large enough to pass through the constriction. It should be noted that such a constriction is not a necessary part of the process of the invention; however, it is a useful method for controlling the rate of particle flow through the reactor. Another way to agglomerate the particles is to spray part of the liquid sulfuric acid into Zone A. When large particles, e.g., 100 to 200 microns, of fluorspar are used in the process, the constriction or spray is not necessary.

Most of the reaction of the sulfuric acid with the fluorspar takes place in the reaction zone, Zone C, of the reactor. This zone has a cross-section that, in conjunction with the particle size and rate of gas flow, will provide the desired settling velocity of the particles. As previously mentioned, the gas in Zone C must be maintained at or near its dew point such that a liquid phase of condensed sulfuric acid is maintained on the surfaces of the particles. The gas temperature is at or near the dew point of the gas stream and falls from about 338° C. to 100° C. or less when operated at one atmosphere pressure since the dew point of the gas stream will drop as the stream becomes diluted with the product hydrogen fluoride gas.

Once this liquid phase is obtained on the surfaces of the particles at reaction temperature, the following reaction occurs:

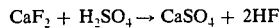

$$CaF_2 + H_2SO_4 \rightarrow CaSO_4 + 2HF$$

The reaction proceeds at a useful rate at temperatures above about 125° C. At lower temperatures, i.e., 65° to 125° C., the reaction does occur; however, the rate is too slow for commercial operations. At temperatures above 150° C., the reaction rate is very fast.

The above reaction is endothermic and the particles tend to cool. The cooling is prevented by the condensation of additional sulfuric acid onto their surfaces. There remains at all times a slight excess of sulfuric acid on the surfaces of the particles or agglomerates since the heat given up by condensation is less than the heat absorbed by the endothermic reaction on a molar basis. This excess sulfuric acid keeps them damp and holds the particles of calcium sulfate formed by the reaction together, allowing the agglomerates to form or to remain intact as the fluorspar is converted to calcium sulfate. As the falling particles enter Zone D, the superheated gas stream evaporates the remaining liquid sulfuric acid on the surfaces of the particles. The dry calcium sulfate particles settle to the bottom of the reactor where they are removed by conventional means, such as a screw conveyor 17 which discharges through line 18.

The crude HF gas produced in the reaction zone will contain fluorspar dust, calcium sulfate, sulfuric acid, sulfur trioxide and water and will leave the reactor through line 19. The amount of solid contaminants in this gas stream can be reduced by spraying liquid sulfuric acid into Zone A. The crude HF gas is treated in the conventional manner to produce commercial grade hydrogen fluoride.

The cross-section area of the particle or agglomerate, its density, and the gas velocity within the column determine the terminal settling velocity of the particles or agglomerates of fluorspar. The gas flow up the reactor is determined by the system mass and energy balances since the fluorspar and the sulfuric acid feeds (sulfuric acid feed includes sulfuric acid fed as liquid sulfuric acid as well as the sulfuric acid formed by the reaction of sulfur trioxide and water vapor) are normally charged in essentially equimolar amounts. The particle terminal settling velocity less the vapor velocity gives the particle settling velocity. Once the agglomerate particle size and settling velocity are established, the height of the reactor can be specified to give the hold time necessary for completing the fluorspar-sulfuric acid reaction, e.g., 5 to 30 seconds.

In a process using a constriction to establish the particle size of the agglomerates, a large turn down in production rate is possible. At lower rates the velocity of the gas stream in the constriction decreases, thus the diameter of the particle or agglomerate allowed to pass into the reaction zone also decreases. These two effects keep the hold time of the particles in the reaction zone about constant.

The rate the particles fall through the reaction zone can be controlled in various others ways as previously set forth. For example, the addition of the inert gas through line 13 can increase the gas flow through the reactor, thus increasing the time the particles remain in the reaction zone. Also if desired, the inert gas can be introduced into Zone C at various locations (not illustrated) for the same purpose.

The sulfuric acid is usually at least 90% $H_2SO_4$ relative to its water content and is preferably 98 to 100% $H_2SO_4$. The sulfuric acid also may contain impurities such as HF, $HSO_3F$, sulfur, metal sulfates and other impurities present in acid streams recovered from the process or as may be present in the acid supply.

The total amount of sulfuric acid introduced into the process of the invention, i.e., either as liquid acid or as sulfur trioxide and water vapor, should be somewhat more than that stoichiometrically required. The acid is ordinarily used in from a 0 to 5% excess, and preferably 0.3 to 1.0% excess, based on complete conversion of the metal fluoride.

Sulfur trioxide, such as is commercially available from the distillation of oleum, is suitable for the process of the invention. Steam introduced into the process will normally be saturated steam as available on a plant, but superheated steam can be used if desired. This superheated mixture of sulfur trioxide, sulfuric acid and water vapor could be used to strip essentially all of the liquid acid from the calcium sulfate in Zone D of the process.

The sulfur trioxide will normally be used in such proportion relative to the steam and the strength of the sulfuric acid so that there will be an overall process water to sulfur trioxide balance of approximately 1 mole of water for each mole of sulfur trioxide. Stronger ratios should not be used because they result in greater formation of fluorosulfuric acid. Weaker ratios should not be used because they increase the moisture content of the product gas stream and ultimately require a water purge.

The temperatures maintained within the reaction zone are important, of course, as to their effect on reaction rate. However, it is essential that the process energy balance be adjusted so that the gas in the reaction zone be at or very near its dew point such that the cooler particles falling into the warmer near-saturated gas stream will result in the condensation of liquid sulfuric acid on the surfaces of the particles or agglomerates. The temperature will, of course, be below the boiling point of sulfuric acid, 338° C. maximum at 1 atmosphere pressure. Sulfuric acid will condense on the particle surface to warm the particle. When the particle temperature is above the minimum temperature for reaction, about 100° C., the fluorspar will react with the liquid sulfuric acid on it surface. Because this reaction is endothermic, the particle will cool, causing more sulfuric acid to condense on the surface of the agglomerate. Because the heat of condensation of the sulfuric acid is less than the endothermic heat of reaction of fluorspar and sulfuric acid on a molar basis, the agglomerated particle remains damp so long as there is any calcium fluoride present in the agglomerate to react. This dampness within the agglomerated particle tends to prevent the agglomerates from falling apart. The gas temperature is a function of how much hydrogen fluoride is created, the agglomerate fluoride content, the type of equipment, and the gas composition, as will be readily understood.

Preferably, to obtain a fast reaction rate, the temperatures should be as high as practical, all other factors being considered, and can range upward to the boiling point. High product gas temperature increases the sulfuric acid carried out in the product gas stream and also increases the energy requirement of the reactor and the cooling requirements of the crude hydrogen fluoride recovery system. Temperatures in the product gas exit zone up to 220° C. have been found to be satisfactory, thus temperatures from top to bottom increasing from 80° to 338° C. at atmospheric pressure are particularly useful.

It is further to be noted that the temperature should be above the dew point of the gas stream toward the end of the reaction of the calcium fluoride to minimize the amount of sulfuric acid which may be carried out of the system as liquid on the byproduct calcium sulfate and the temperature should be lower near the point where the hydrogen fluoride is taken off to reduce the amount of sulfuric acid vapor carried off with the product and required to be condensed and returned. It will be seen that this type of temperature gradient will result in the equipment as illustrated because the liquid sulfuric acid is added near the top of the reaction zone and the superheated stream of steam and $SO_3$ is added near the bottom.

Of course, it will be appreciated that the pressure at which the process is operated will influence the temperatures at which successful operation can be obtained. For example, the use of superatmospheric pressures will permit sulfuric acid to condense on metal fluoride particles at temperatures above the atmospheric boiling point (338° C.) of sulfuric acid. Conversely, vacuum operation will reduce the temperature at which sulfuric acid will condense and thus permit operation at lower temperatures. Therefore, by the proper selection of pressure, temperature and equipment size the process can be conducted according to the invention at almost any temperature above that at which sulfuric acid and an alkali metal fluoride start reacting, i.e., about 100° C.

The walls of the reactor should be kept warm to avoid condensation of sulfuric acid on the walls. This can be done by the use of external heating means, such as steam or electrical heating or in other instances insulation of the walls will reduce condensation and the resulting corrosion. In another embodiment a double wall reactor can be employed. The sulfur trioxide and steam can be fed into the reactor between the walls, thus keeping the inner wall warm.

The invention will be further explained by the following illustrative teachings of modes contemplated for carrying out the invention. These examples do not record actual experiments, but rather teachings on how to practice the process of the invention.

EXAMPLE 1

Using apparatus of the type shown in the FIGURE, 45,000 lb/hr of commercial "acid-grade" fluorspar (77% through 200 mesh, and containing 1% silica and 2% calcium carbonate) is distributed in the top of the reactor through line 11. The gas temperature gradient in Zone A is about 162° to 230° C. The solids temperature gradient is about 25° to 225° C. The temperature of the fluorspar feed is 25° C. The diameter of the constriction in Zone B is 7.9 ft and Zone C is 9 ft. The height of the reaction zone is 70 ft. Into feed pipe 12, 31,050 lb/hr of sulfur trioxide vapor at 100° C. and 6,350 lb/hr of steam at 120° C. are fed. Liquid acid containing 19,800 lb of sulfuric acid, 5,160 lb of calcium sulfate, 640 lb of hydrogen fluoride, and 230 lb of water is fed via feed pipe 15 to the acid sprays 14 each hour. The temperature of the solids discharged from the reactor via line 18 is 338° to 390° C. These solids will contain calcium fluoride, calcium sulfate and sulfuric acid. The temperature of the $SO_3$-steam mixture entering Zone D is about 394° C. The temperature at the bottom of the reaction zone is 330° C. and at the top of the reaction zone is 280° C. The product HF gas leaving the reactor via line 19 is expected to contain 22,450 lb/hr HF, 800 lb/hr $SiF_4$, 400 lb/hr $CO_2$, 140 lb/hr $H_2SO_4$, 20 lb/hr $SO_3$, 10 lb/hr $H_2O$, 400 lb/hr $SO_2$, 20 lb/hr air and 5,160 lb/hr calcium sulfate. The crude HF gas from the reactor will be scrubbed with a commercial grade 99% sulfuric acid stream to remove the calcium sulfate and/or calcium fluoride present. The scrubbing acid containing the calcium sulfate dust and saturated with respect to HF and water is then fed to the reactor via feed line 15. The hydrogen fluoride gas leaves the scrubber, is condensed and is purified by distillation to produce hydrogen fluoride.

EXAMPLE 2

Using apparatus of the type shown in the FIGURE, 2,570 lb/hr of commercial "acid-grade" fluorspar (70% through 200 mesh, and containing 1% silica and 2% calcium carbonate) is distributed in the top of the reactor through line 11. The temperature gradient in Zone A is about 200° to 230° C. The fluorspar feed is at ambient temperature. The diameter of the constriction in Zone B is 12 inches and of Zone C is 16 inches. The height of the reaction zone is 50 ft. Into feed pipe 12, 1,760 lb/hr of sulfur trioxide vapor at 100° C. and 360 lb/hr steam at 120° C. are fed. Liquid acid containing 1,000 lb/hr of sulfuric acid is fed via feed pipe 15 to the acid sprays. The temperature of the solids discharge from the reactor via line 18 is 335° C. These solids contain calcium fluoride, calcium sulfate and sulfuric acid. The temperature of the $SO_3$-steam mixture entering Zone D is 400° C. The temperature at the bottom of the reaction zone is 333° C. and at the top of the reaction zone is 290° C. The product HF gas leaving the reactor via line 11 is expected to contain 1200 lb/hr HF, 45 lb/hr $SiF_4$, 20 lb/hr $CO_2$, 40 lb/hr $H_2SO_4$, 8 lb/hr $SO_3$, 30 lb/hr $H_2O$, 20 lb/hr $SO_2$, 1 lb/hr air and 270 lb/hr calcium fluoride. The crude HF gas from the reactor is scrubbed with 99% sulfuric acid stream to remove the calcium fluoride present. The scrubbing acid containing the calcium sulfate dust is saturated with HF and water vapor and is fed to the reactor via feed line 15. The hydrogen fluoride gas leaves the scrubber, is condensed and is purified by distillation.

I claim:

1. In a process for producing hydrogen fluoride by the reaction of sulfuric acid with a metal fluoride to produce gaseous hydrogen fluoride and metal sulfate wherein the energy balance is satisfied by feeding part of the sulfuric acid required for the mass balance as vaporous sulfur trioxide and steam and the remainder is fed as liquid sulfuric acid, the improvement comprising dropping particles of said metal fluoride having a particle size between 1 and 300 microns through the reaction zone of a vertical, stationary reactor countercurrent to a gas stream containing sulfur trioxide, sulfuric acid and water vapor, said gas stream being at or near its dew point in the reaction zone, introducing liquid sulfuric acid into the reaction zone, the rate of fall of said particles within the reaction zone being such that a liquid phase of condensed sulfuric acid is maintained on the surfaces of the particles while in said zone and the particles and acid are maintained in the free fall state for a preiod of time sufficient to complete the reaction to form gaseous hydrogen fluoride, and recovering gaseous hydrogen fluoride from the top of said reactor and removing metal sulfate from the bottom of said reactor.

2. The process of claim 1 wherein the metal fluoride is selected from alkali metal fluorides and alkaline earth metal fluorides.

3. The process of claim 1 wherein the metal fluoride is calcium fluoride.

4. The process of claim 1 wherein the gas stream also contains gaseous hydrogen fluoride or air.

* * * * *